Patented Nov. 24, 1942

2,302,928

UNITED STATES PATENT OFFICE 2,302,928

RECOVERY OF WATER SOLUBLE VITAMINS FROM FISH LIVERS

Clarence Walter Whitmoyer and William James Moore, Myerstown, Pa., assignors to Whitmoyer Laboratories, Inc., Myerstown, Pa., a corporation of Delaware No Drawing. Application July 2, 1940, Serial No. 343,552

7 Claims. (Cl. 99—2)

This invention relates to the recovery of water soluble vitamins from fish livers.

It has been general practice to recover oils from fish livers and more particularly the oil of the livers of cod fish. The cod liver and other similar fish liver oils are known to contain valuable oil soluble vitamins, particularly the vitamins A and D. These oils, being sources of these vitamins, have become very valuable products of commerce.

In the commercial production of fish liver oil, such as oil from the livers of cod, hake, haddock pollock, and like fish, the livers are usually subjected to a steaming or cooking. Solvent extraction processes and so-called cold extraction process have been proposed. In any event, very little, if any, attention has been paid to the loss of valuable water soluble vitamins of the livers incident to the production of the fish liver oils in the commercially practiced processes.

This invention is directed to the recovery of water soluble vitamins of fish livers which have heretofore been destroyed or discarded in the processes practiced to recover the oils of the fish livers. According to the invention, the water soluble vitamins need not be destroyed or thrown away as a waste by-product but may be retained in a form adapted to be utilized for many and diversified purposes.

To accomplish these desirable ends, the invention comprehends the treatment of the fish liver with a pectin containing substance in such form that the substance may be intermixed with mascerated, comminuted, ground or minced livers. When so mixed the water occluded in the liver tissue may be released together with water soluble vitamins contained therein and retained in the pectin containing substance. Thereafter, the water so extracted from the cell tissue may, if desired, be removed by evaporation to produce a resultant residue containing the water soluble vitamins.

The selection of the pectin containing substance to be used in the treatment of the livers will depend largely upon the nature of the end product to be produced and whether or not the liver oil is to be recovered separately. We prefer, however, to use a pectin containing substance of a type which is high in carbohydrate content to produce an end product which will contain predetermined quantities of protein, fat and carbohydrates in such proportions that the resultant mixture will serve as an animal or poultry feed or feed supplement. Such an end product has proved of great value for feeding poultry since it may be made to contain water soluble and oil soluble vitamins and particularly the vitamins which promote health and growth, as well as carbohydrates, fat, animal and vegetable proteins, organic minerals and the like.

The pectin containing substances which we have used with satisfactory results are those which are ordinarily considered as waste by-products such as, for example, pomace of sweet potato, tomato and citrus fruit.

The invention further comprehends the new and novel features of operation and the new and original arrangement and combinations of steps in the process herein described and more particularly set forth in the claims and also comprehends the production of a feed or feed supplement having the general characteristics and features of utility herein set forth and claimed

Having thus described the nature of the invention, the following more specific examples are set forth for purposes of illustration as to the manner and process of making products according to the invention:

Example I

To 83½ pounds of ground cod fish livers we added 16½ pounds of comminuted, substantially dry, pomace of sweet potato. These were mixed thoroughly for several minutes to cause intimate contact. Ordinarily, five to ten minutes will be sufficient although a longer time may be preferable to insure that the pectin containing material will have taken up substantially all of the water occluded in the cell tissue. This will cause the oil and water occluded in the liver to be released and freed from the cell tissue. The oil can then be collected separately by subjecting the mixture to pressure, as the pomace containing pectin will retain the water and allow the oil to be separated, even when the mass is subjected to relatively high pressures. That is, substantial quantities of oil may be squeezed out while the water is retained in the press cake residue.

Any suitable press may be used. We have found that an ordinary wine press is satisfactory. From the cod livers mentioned above, we obtained at room temperature, 40 pounds of oil which was effectively released and easily separated from the mass, leaving a press cake which retained the water initially present in the livers. This press cake analyzed approximately 41% water, 19⅓% fat and 39⅔% liver tissue-pomace mixture.

After separation from the press cake of the oil released from the liver, the residual press cake was easily disintegrated into a crumbly, farinaceous product. After disintegration, the residual product may be conveniently dried. In this example we dried the product for two days at about 130° F. After the dehydration, the residual product weighed 37⅖ pounds and analyzed as follows:

| | Per cent |
|---|---|
| Moisture | 4.2 |
| Fat | 28.0 |
| Protein | 25.8 |
| Ash | 4.1 |
| Fiber | 5.5 |
| Carbohydrates | 37.9 |

The product so produced, after grinding, is farinaceous and is admirably suited for feeding to animals or poultry, or, it may be utilized as a feed supplement for blending with other feeding material. It is characterized particularly by its water soluble vitamin content. Some of the water soluble vitamins are commonly known as growth-promoting factors. In addition, the product supplies a source of oil soluble vitamins as a certain amount of residual oil will cling to the liver tissue and pomace in the pressing operation. Moreover, the product contains the water soluble proteins initially present in the livers as well as the carbohydrates of the pectin containing pomace. Stated briefly, none of the nutrients are discarded or wasted as water only is removed from the livers and the dehydration may be done at a temperature low enough to prevent substantial destruction of the vitamins, yet at a rate which does not result in putrefaction.

Example II

To 69 pounds of minced cod livers were added 31 pounds of dry pomace of tomato. These were mixed until the tissue structure was thoroughly macerated. The mass was then placed in a press and subjected to pressure at room temperature (between 60° F. and 70° F.) until about 35 pounds of cod liver oil were removed. The pectin containing pomace under these pressure conditions will retain the water but permit substantially all the liver oil to be separated from the mass and it can be collected separately.

The press cake then contained approximately 42% water, 17½% fat and 40½% liver tissue pomace mixture. The press cake was then dried at a temperature of about 130° F. for two days. Following drying, the cake was then ground and it produced 38½ pounds of substantially dry farinaceous product which was not putrefactive. It analyzed as follows:

| | Per cent |
|---|---|
| Moisture | 4.10 |
| Crude fat | 28.17 |
| Crude protein | 28.94 |
| Crude fiber | 24.00 |
| Ash | 3.20 |
| Carbohydrates | 38.78 |

Example III

To 70 pounds of minced cod livers were added 30 pounds of dry commercial pomace of citrus fruit. The mass was thoroughly mixed. The mixture was pressed to remove oil as completely as possible. This yielded about 30 pounds at room temperature (60° to 70° F.). The resultant press cake weighed about 70 pounds. This analyzed about 44% water, 15% fat and 41% liver tissue pomace mixture.

The press cake was then dried at about 130° F. After removal of moisture until the cake was substantially dry, it was ground and the resulting residue weighed about 39 pounds which analyzed as follows:

| | Per cent |
|---|---|
| Moisture | 3.50 |
| Crude fat | 25.90 |
| Crude protein | 27.03 |
| Crude fiber | 8.50 |
| Ash | 4.20 |
| Carbohydrates | 41.90 |

From the analyses it will be observed that products made according to the invention are well suited for feeding to animals and poultry; particularly in view of the fact that the products contain valuable oil soluble vitamins of fish liver, especially the vitamins A and D known to exist abundantly therein, and also in view of the fact that the products contain an abundance of water soluble vitamins which are conducive to health and growth promotion. Moreover, the products will also contain water soluble proteins and organic minerals, particularly iodine, initially present in the livers. In some instances the iodine content was found to be 7500 parts per billion.

The presence of the water soluble growth-promoting factors, as well as the presence of oil soluble vitamins, in the product of the invention, has been definitely demonstrated by feeding to test animals and making comparison on growth rate with other animals fed on a diet containing the same class of proteins but deficient in the growth-promoting vitamin factors. Further demonstration of the nutritive value and growth-promoting value of products made according to the invention has been made by incorporating the product in a balanced ration which had to depend on the product of the invention for growth-promoting vitamin factors and animal protein and then making comparisons with a ration which had these factors supplied by one of the most common sources of them, namely, powdered skim milk.

It will be noted that the process of the invention may be carried out at temperatures sufficiently low to prevent cooking with consequent substantial destruction of vitamins which high temperatures are known to destroy. Heretofore, it has been common practice to cook the livers which sterilized them and prevented putrefaction but at the same time valuable vitamins were destroyed. Our invention, however, produces a non-putrefactive product at a temperature sufficiently low to preserve the valuable vitamins. No appreciable putrefaction takes place during the process and the resultant product, if kept reasonably dry, will not thereafter putrefy or ferment.

Moreover, the resultant product can be controlled within wide limits as to fat, carbohydrate and protein content. It will be understood that the examples given are primarily illustrative both as to temperature and quantities. The limits will be bounded by the amount of pectin containing materials which will give the desired water extraction from the cell tissue of the livers. The amounts will depend largely upon the condition, source and kind of livers being treated. In practising the invention, quantities of pomace ranging approximately from 12% to 45% of the total pomace liver mixture has been used with satisfactory results with various kinds of livers. Under unusual circumstances even higher or lower concentrations are possible. In some instances we have dehydrated the product down to 2% moisture but ordinarily a higher moisture content is satisfactory. The carbohydrate content of products which we have produced, according to the invention, has varied from about 30% to 50%.

Also, the temperatures for dehydration may vary. That temperature which will dehydrate at a rate to avoid accompanying putrefaction may be used as a lower limit. On the other hand, an upper temperature short of a temperature which would materially destroy the contained vitamins may be used in the drying; bearing in mind that the higher temperatures are conducive to vitamin destruction. A temperature of 105° to 130° F. is the range which we prefer. Under partial vacuum the drying temperature may be correspondingly reduced.

It will be noted furthermore, that materials such as the pomaces mentioned in the foregoing which are often thrown away as waste may be utilized. They are low in protein but high in carbohydrates. The livers are high in fat and protein and low in carbohydrate. According to the invention, a product may be produced with predetermined quantities of fat, protein and carbohydrates in a form admirably suited for animal and poultry feeding, or as a blending material for making a balanced feeding ration, and the product is further characterized by retaining abundant quantities of oil soluble vitamins and the water soluble health and growth-promoting vitamins initially present in the fish livers.

While certain novel features of the invention have been disclosed herein, and are pointed out in the annexed claims, it will be understood that various omissions, substitutions and changes may be made by those skilled in the art without departing from the spirit of the invention.

What is claimed is:

1. A method of recovering water soluble vitamins from fish livers which comprises mixing cell tissue of cut livers with a dried pomace from a vegetable source containing pectin in sufficient quantity to release substantially all the water contained in said cell tissue and to free oil occluded therein, pressing said mixture whereby to cause said water with water soluble vitamins contained in said cell tissue to separate from the oil contained therein and then collecting the admixed residual liver tissue and pectin containing material having incorporated therein water soluble vitamins extracted from said livers.

2. A method of recovering water soluble vitamins from fish livers which comprises mixing cut livers with a pomace containing pectin in sufficient quantity to release substantially all the water contained in said livers and to free the oil occluded therein, subjecting said mixture to sufficient pressure to cause the freed oil to separate from said mixture, collecting the admixed residual liver tissue and pectin containing material having incorporated therein water soluble vitamins extracted from said livers and then dehydrating the residual mixture at a temperature below cooking temperature.

3. A method of obtaining water soluble vitamins and proteins from fish livers which comprises, mixing cut livers with a pectin containing pomace of vegetative origin having a high carbohydrate and low protein content, manipulating the mixture whereby to cause the water together with water soluble vitamins and proteins to become incorporated with said pomace and to cause oil contained in said livers to be freed therefrom, effecting a separation of the freed oil and collecting the liver tissue and the pectin containing pomace as an admixed residue having relatively high carbohydrate and protein content and having incorporated therein water soluble vitamins and proteins initially present in said livers.

4. A method of recovering water soluble vitamins from fish livers which comprises mixing cut livers with comminuted, dry pomace of a vegetative product from the class including tomato, citrus fruit and sweet potato in sufficient quantity to release substantially all the water contained in said livers and manipulating said mixture whereby to cause said water with water soluble vitamins contained in said livers to separate from the oil contained in said livers and then collecting the admixed residual liver tissue and pectin containing pomace having incorporated therein water soluble vitamins extracted from said livers and then dehydrating the residual mixture at a temperature sufficiently low as not to cause material destruction of contained vitamins.

5. A method which comprises, intermixing comminuted fish livers and pomace of sweet potato in the approximate ratio of five parts of liver to one part of pomace, subjecting the mixture to sufficient pressure to separate the oil released from the liver tissue and to form a residue containing substantially all of the water soluble vitamins and proteins initially present in said livers and then evaporating from said residue substantially all the water originally present in said livers to form a substantially dry farinaceous product resistant to putrefaction.

6. A method of obtaining water soluble vitamins and proteins from fish livers which comprises, mixing cut livers with a pectin containing pomace from the class comprising sweet potato, tomato and citrus fruit in the proportions of from about 12 to 30 pounds of pomace to 70 to 88 pounds of liver, manipulating the mixture thereby to cause the water together with water soluble vitamins and proteins to become incorporated with said pomace mixture and to cause oil contained in said livers to be freed therefrom, pressing the mixture to effect a separation of the freed oil and collecting the liver tissue and the pectin containing pomace as an admixed residue having incorporated therein water soluble vitamins and proteins from said livers.

7. A method which comprises, intermixing cut fish livers and a substantial quantity of pomace of sweet potato, subjecting the mixture to sufficient pressure to separate oil released from the liver tissue and to form a residue containing a substantial quantity of the water soluble vitamins and proteins initially present in said livers and then evaporating from said residue substantially all the water originally present in said livers to form a substantially dry crumbly product.

CLARENCE WALTER WHITMOYER.
WILLIAM JAMES MOORE.